(12) United States Patent
Haskell (10) Patent No.: US 9,399,166 B1
(45) Date of Patent: Jul. 26, 2016

(54) SYSTEM AND METHOD FOR OBJECT WEAKPOINT GENERATION

(71) Applicant: Epic Games, Inc., Cary, NC (US)

(72) Inventor: Cody Michael Haskell, Raleigh, NC (US)

(73) Assignee: EPIC GAMES, INC., Cary, NC (US)

( * ) Notice: Subject to any disclaimer, the term of this patent is extended or adjusted under 35 U.S.C. 154(b) by 117 days.

(21) Appl. No.: 14/294,738

(22) Filed: Jun. 3, 2014

(51) Int. Cl.
*A63F 9/24* (2006.01)
*A63F 13/00* (2014.01)
*G06F 17/00* (2006.01)
*G06F 19/00* (2011.01)

(52) U.S. Cl.
CPC .................................... *A63F 13/00* (2013.01)

(58) Field of Classification Search
CPC .................................................. A63F 13/5378
See application file for complete search history.

(56) References Cited

U.S. PATENT DOCUMENTS

| | | | | |
|---|---|---|---|---|
| 6,217,446 B1* | 4/2001 | Sanbongi | ................ | A63F 13/10 345/419 |
| 6,267,674 B1* | 7/2001 | Kondo | .................... | A63F 13/10 463/32 |
| 2005/0176503 A1* | 8/2005 | Sakamoto | ............... | A63F 13/10 463/31 |
| 2008/0287175 A1* | 11/2008 | Kusuda | ................... | A63F 13/12 463/17 |
| 2012/0315997 A1* | 12/2012 | Deal | ....................... | A63F 13/10 463/43 |

OTHER PUBLICATIONS

Aequinox, "MW3: An entire new approach to weapon balance," Mar. 21, 2011, http://denkirson.proboards.com/thread/2794.*

* cited by examiner

*Primary Examiner* — Kevin Y Kim
(74) *Attorney, Agent, or Firm* — Hunton & Williams LLP (57) ABSTRACT

Systems and methods are provided for dynamic calculation of weakpoints in objects during gameplay. A player strikes an object and a weakpoint appears somewhere on the surface of the object. If the player strikes that weakpoint, the weakpoint disappears, and the amount of damage imparted to the object is some multiple (or factor) of the normal damage imparted. The player's camera position and direction is used to find points on the surface of the object that was struck. The position and direction of the player's camera is used to ensure that the player will be able to see any weakpoint that might be created. The points on the object are recorded. The recorded points are compared against each other and the best point is chosen based on certain criteria.

18 Claims, 7 Drawing Sheets

SYSTEM AND METHOD FOR OBJECT WEAKPOINT GENERATION

FIELD OF PREFERRED EMBODIMENTS

Exemplary embodiments relate generally to computer gaming, including online gaming. Specifically, exemplary embodiments provide a system and method for dynamically generating object weakpoints during gameplay, that, when struck by or otherwise interacted with by a player character within the computer game, generate an enhanced response (e.g., more damage than a normal strike would generate).

BACKGROUND

In many computer games, resource gathering is monotonous and unengaging for players. As a result, players typically check-out when engaging in these activities. This leads to a less than desirable playing experience. Additionally, players often invoke cheat codes and modes to gather resources to avoid the monotony thereof.

Furthermore, weakpoint placement in games is typically static and pre-calculated, as it is done during the design of the game. This leads to players being able to know where each weakpoint is located (that is, once the player has played through the game) given that such points are fixed in the game universe. Stated differently, players are able to memorize the fixed weakpoint locations within the game universe. These weakpoints are also time consuming for game designers to place and once placed, are not modifiable during gameplay, except through a patch or cheat mode.

These and other deficiencies exist.

SUMMARY OF THE PREFERRED EMBODIMENTS

An exemplary embodiment includes a computer implemented method with the following steps: receiving a camera position and a direction of a player in a computer game based on a player interaction with an object; identifying a plurality of points on a surface of the object based on information from the camera position towards the object; comparing each of the plurality of points against one another; determining a best point from the comparing; and generating a weakpoint on the surface of the object based on the best point.

In another exemplary embodiment, the preceding method may be performed a second and subsequent times following the player striking the first weakpoint.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

DETAILED DESCRIPTION OF THE PREFERRED EMBODIMENTS

It will be readily understood by those persons skilled in the art that the embodiments of the inventions described herein are capable of broad utility and application.

The following descriptions are provided of different configurations and features according to exemplary embodiments. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details regarding the present invention. It should also be appreciated that these exemplary embodiments are provided as non-limiting examples only.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that embodiments described may be integrated into and run on a computer, which may include a programmed processing machine which has one or more processors. Such a processing machine may execute instructions stored in a memory to process the data and execute the methods described herein.

For the methods depicted herein, each block shown in the Figure represents one or more processes, methods, and/or subroutines carried out in the exemplary methods. Each block may have an associated processing machine or the blocks depicted may be carried out through one processor machine. Furthermore, while the steps may be shown in a particular order, it should be appreciated that the steps may be conducted in a different order.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

The logic herein described may be implemented by hardware, software, and/or a combination of the two. In embodiments where the logic is implemented using software, upgrades and other changes may be performed without hardware changes. The software may be embodied in a non-transitory computer readable medium.

The following description is intended to convey a thorough understanding of the embodiments described by providing a number of specific embodiments and details involving systems and methods for weakpoint (or weakspot) generation. The terms "weakpoint" and "weakspot" may be used interchangeably. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

According to exemplary embodiments, a player may have the following experience: the player, through their player character, may strike an object (such as with a weapon) and a weakpoint may appear somewhere on the surface of the object (in a different location than was just struck). If the player then strikes that weakpoint, the weakpoint may disappear, and the amount of damage imparted to the object may be a multiple (or factor) of the normal damage imparted. Subsequent weakpoints may be generated. It should be appreciated that the player may interact with the object in additional ways beyond striking the object. For example, the player may push an object, hit an object with a projectile, dig into the ground, and/or merely look in the direction of the object. These actions may cause a weakpoint to appear as described herein according to exemplary embodiments. It should be also appreciated that another result, instead of or in addition to damage, may happen to the object as a result of the interaction. For example, the object may change position and/or may alter its appearance. In various embodiments, rather than damage the object, the strike may impart points to the object such that the object is repaired or regenerated (i.e., the opposite of damaging the object). This may be a repair point. In various embodiments, the strike may slow down the destruction of the object rather than speeding up the destruction. For example, the strike of the weakpoint may cause less damage to be imparted to the object (i.e., a fraction of the normal strike damage). This may be a strongpoint. In various embodiments, combinations of these different types of damage/repair points may be used. For example, striking a first weakpoint may cause a fraction of the normal strike damage, but striking additional weakpoints may cause an increase in damage. In some embodiments, not striking the weakpoint (e.g., missing the weakpoint) may cause regeneration of the object.

This embodiment may be implemented as follows using both the client and server sides: when the player strikes an object, the player's camera position and direction may be sent to the server from the client. When the server receives the player's camera position and direction, it may use this information to find points on the surface of the object that was struck. This may be done by casting physic traces from the camera position towards the object that was struck. A physic trace may be a query of the physics geometry of the game world or universe. This may be separate from the visual geometry (that is visible to a player). According to exemplary embodiments, a function may be called that evaluates a start point of the trace, an end point of the trace, and a trace channel. The trace channel may be described as a type of object that is being tested for. This trace channel is looking for objects that block the static world geometry. Accordingly, starting from the start point, and going towards the end point, the called function may return the first object that has a static world geometry channel set to block. For example, the function may return information on the trace that hits the object which was struck. More than one physics trace may be cast and each such trace may hit the object at a different position.

The position and direction of the player's camera may be used to ensure that the player will be able to see any weakpoint that might be created. The points where a physics trace hits the object may be recorded. The recorded points may be compared against each other and the best point may be chosen therefrom. What constitutes the "best point" may be defined in various ways. For example, the best point may be based on a distance from the center of the screen (e.g., farther away is better). In other embodiments, the distance from possible previous weakpoints may be used (e.g., farther away is better). In other embodiments, the best point may be determined by a direction of the normal of the surface struck by the physics trace (e.g., the more it points towards the player's screen, the better). In various embodiments, the best point may be based on a combination of the distances and the direction described above. In other embodiments, the best point may be compared to a predetermined location, threshold, and/or benchmark.

When the best point is chosen, one or more weakpoints may be created at that point or at a location near that point. When a player strikes a weakpoint, the damage may be calculated as if the player struck the surface that the weakpoint is placed on. In exemplary embodiments, an additional multiplier (or factor) may be applied to the final damage value. In various embodiments, as described above, striking the weakpoint may have other effects, such as fractional damage and/or repair/regeneration of the object. It should be appreciated that striking the weakpoint may yield other benefits to the player, such as resources or skill points or rewards. In various embodiments, combining/chaining of weakpoints may occur and/or different types of weakpoints may be generated.

It should be appreciated that weakpoints may not be confined to static objects. For example, there may be weakpoints on Non-Player Characters (NPCs) or other dynamic, moveable objects. In some embodiments, a NPC may take several strikes to defeat, but after the first strike a weakpoint could appear on the NPC that would cause greater damage to the NPC if struck. In some embodiments, combining/chaining and/or different types of weakpoints as described herein may be used on NPCs. Accordingly, the use of the term object in the various embodiments is meant to be exemplary and non-limiting and is meant to include a variety of different items in a game universe, static and dynamic as well as humanoid and non-humanoid.

Figure 1:
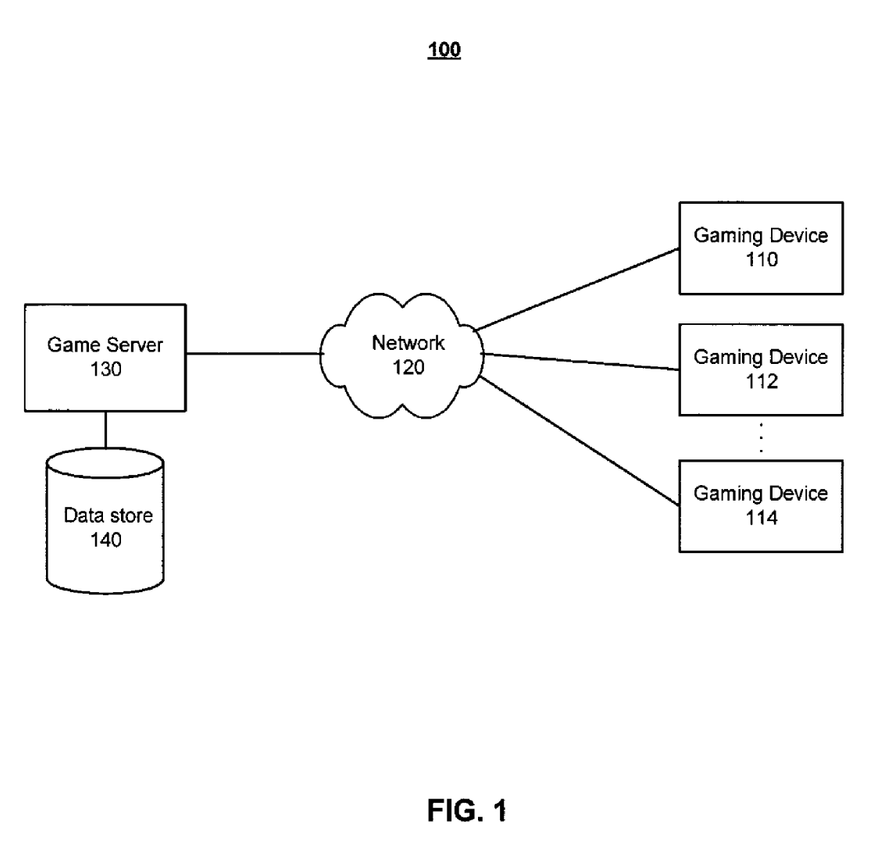
FIG. 1 is a diagram of a system in accordance with an exemplary embodiment.

FIG. 1 depicts a system according to an exemplary embodiment. System 100 may provide various functionality and features associated with the program. More specifically, system 100 may include gaming devices 110, 112, 114, a network 120, a game server 130, and a data store 140. In various embodiments, the term "game" or "client" may refer to the software product a person is using. In various embodiments, the term "game server" may refer to the networked computer or groups of computers that process and provide a game event.

The gaming devices 110, 112, and 114 may each include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a game server, a gaming console, or other device. The network-enabled computer system may execute one or more software applications to, for example, receive data as input from an entity accessing the network-enabled computer system, process received data, transmit data over a network, and receive data over a network, such as the network 120. The one or more network-enabled computer systems may also include one or more software applications which perform the functions as described herein.

The game server 130 may include a network-enabled computer system and/or devices. The network-enabled computer system may execute one or more software applications to, for example, receive data as input from an entity accessing the network-enabled computer system, process received data, transmit data over a network, and receive data over a network, such as the network 120. The one or more network-enabled computer systems may also include one or more software applications which perform the functions as described herein.

The game server 130 may include various modules to perform the functions described herein. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

The game server 130 may contain data storage for gaming software (e.g., game executable code), storing and tracking gameplay data, and/or player data, for example, as represented by data store 140. Data store 140 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, the data store 140 may be a database, such as an Oracle database, a Microsoft SQL Server database, a DB2 database, a MySQL database, a Sybase database, an object oriented database, a hierarchical database, a NoSQL type database, or other database. Data storage may also utilize flat file structures for storage of data. While the data store 140 is illustrated as a single component in the exemplary figure, the system may include a single consolidated data store or multiple data stores at the same location or distributed across multiple locations.

The network 120 may be one or more of a wireless network, a wired network or any combination of wireless network and wired network. For example, the network 120 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, the network 120 may include, without limitation, telephone lines, fiber optics, IEEE Ethernet 902.3, a wide area network ("WAN"), a local area network ("LAN"), or a global network such as the Internet. The network 120 may support an Internet network, a wireless communication network, a cellular network, or the like, or any combination thereof. The network 120 may further include one network, or any number of the exemplary types of networks mentioned above, operating as a stand-alone network or in cooperation with each other. The network 120 may utilize one or more protocols of one or more network elements to which they are communicatively coupled. The network 120 may translate to or from other protocols to one or more protocols of network devices. Although the network 120 is depicted as a single network, it should be appreciated that according to one or more embodiments, the network 120 may comprise a plurality of interconnected networks, such as, for example, the Internet, a service provider's network, a cable television network, corporate networks, and home networks.

Figure 2:
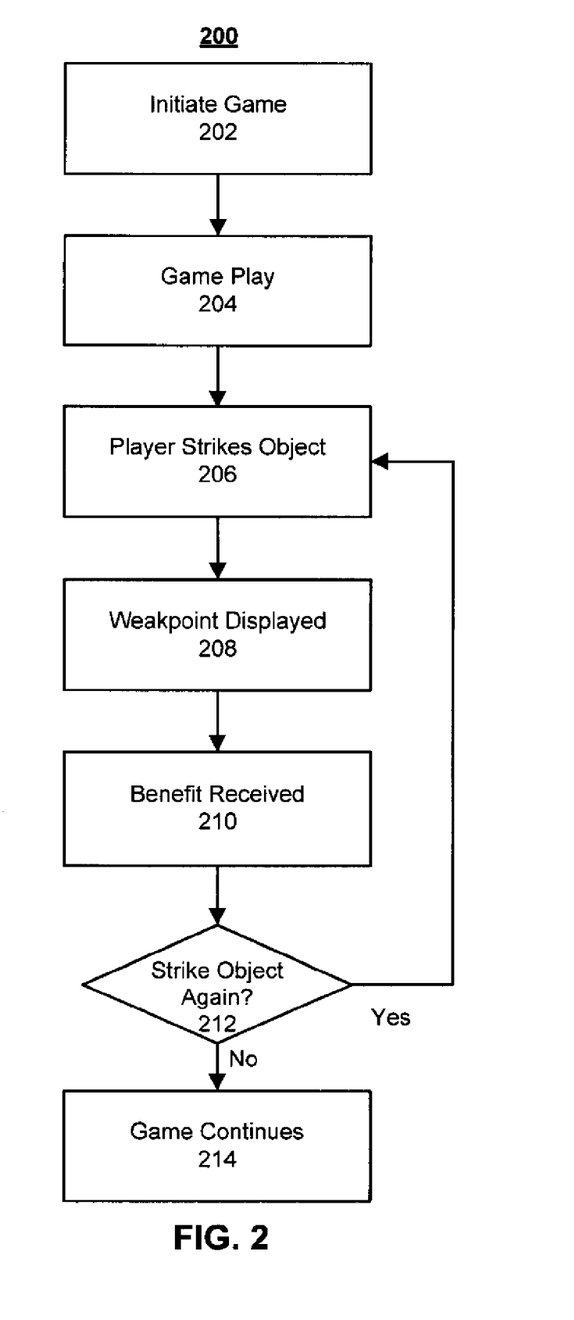
FIG. 2 is a flow chart of a method for weakpoint interaction during gameplay in accordance with an exemplary embodiment.

FIG. 2 depicts a flow chart of a method for weakpoint interaction during gameplay according to exemplary embodiments. Exemplary method 200 is provided by way of example, as there are a variety of ways to carry out the methods disclosed herein. The method 200 as shown in FIG. 2 may be executed or otherwise performed by one or a combination of various systems, such as a computer implemented system.

At block 202, a computer-based game is commenced. The game may be of any type or genre. For example, the game may be an online game or a game running on a local PC associated with a player. The game executable file may be resident on a local computer (a client) or on a server (which may be remote from the local computer) or reside on both. For example, the game may involve a client-server set-up whereby the player is using a client computer which is in communication with a server computer over a computer based network. The server may be remotely located from the client computer. In some embodiments, a connection to a computer based network, such as the Internet, may be required to play the game. For example, an on-line game may require an Internet connection to play. In various embodiments, the game may be playable "offline" (e.g., the client not actively connected to a computer based network) with either limited or full functionality. For example, in an offline mode, only certain features or gameplay functionality may be available to the player.

The game may involve one or more players. For example, the game may be a single player game or a multi-player game.

At block 204, gameplay occurs. The gameplay may involve the player(s) interacting with the gaming universe/environment by performing various actions such as movement, shooting, solving puzzles, and/or communicating with other players and/or NPCs. The player(s) may interact with the gaming universe through a player character which the player (s) control.

At block 206, a player may strike or otherwise interact with an object. Part of the gameplay may involve interacting with objects in the game. For example, the player may be able to strike objects to collect resources from the object. One example is striking a vehicle may yield metal or certain parts. The resource amount may be based on the amount of damage done to the object. It should be appreciated that, as noted above, object can refer to a variety of items within the game, both static and dynamic, and includes such things as NPCs.

In other embodiments, objects may be struck to destroy them in order to clear a path or change the layout of the game universe. For example, an object may be blocking a path or in the way of an area in which the player desires to create a structure. It should be appreciated that these examples are exemplary and non-limiting, as a variety of other scenarios may involving striking objects in the game universe are possible.

At block 208, a weakpoint appears on the surface of the object. The weakpoint may appear as a graphical symbol or indicator that is visible to the player. The weakpoint may appear anywhere in the surface of the object, near the object as well as on or near associated objects or points in the game.

At block 210, if/when the player strikes that weakpoint, the weakpoint disappears, and the amount of damage imparted to the object may be a multiple of the normal damage imparted. The player may receive a specified amount of a resource or points or some other reward and/or benefit from striking the weakpoint.

At block 212, the player may strike the object again (or interact therewith). As depicted in the method 200, the method may be repeated for the same object. For example, each time an object is struck, a weakpoint may be generated. In various embodiments, the method may be repeated throughout the game for various objects during gameplay.

In various embodiments, a strike on an object may generate multiple weakpoints that may be chained together such that one appears after one is struck. A graphical symbol or indicator may appear indicating the direction or location of the subsequent weakpoint that appears immediately following the strike of the weakpoint. This symbol or indicator may appear prior to the graphical symbol or indicator for the subsequent weakpoint. In other embodiments, the weakpoints may appear at once. The weakpoints may remain active for a certain length of time. The weakpoints may disappear after the time expires. The weakpoints may not regenerate for subsequent strikes on the object.

At block 214, the game continues once the player stops striking or interacting with the object or the object is destroyed. At some point, the game may end when the player(s) quit the game or the game is completed.

Figure 3:
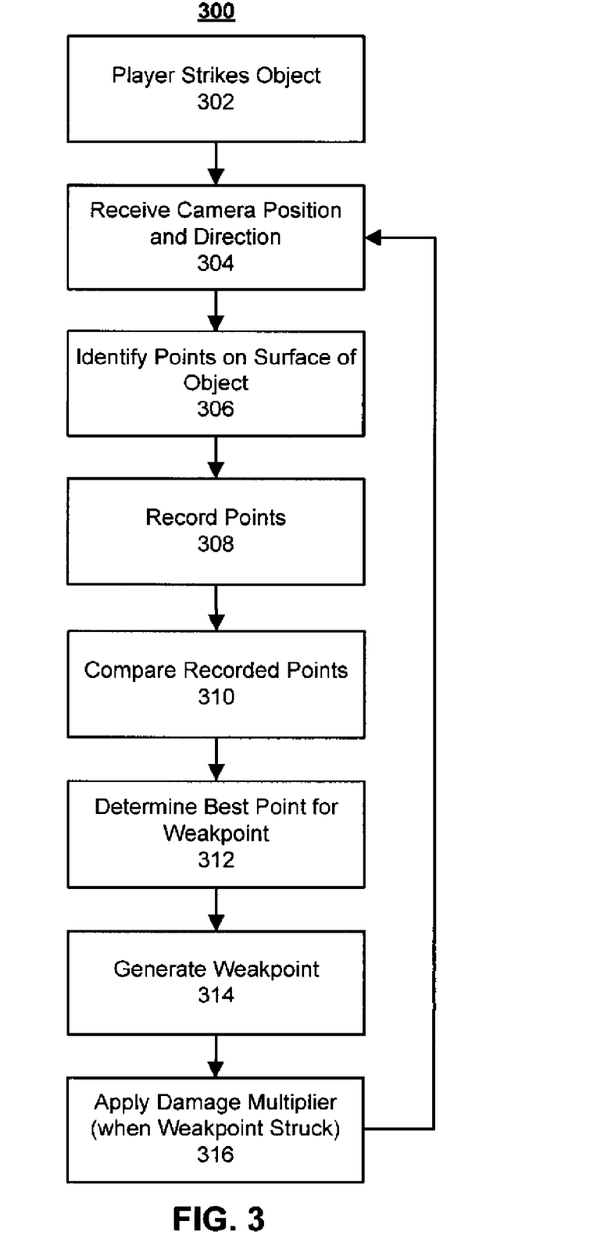
FIG. 3 is a flow chart of a method of weakpoint generation in accordance with an exemplary embodiment.

FIG. 3 depicts a flow chart of a method for weakpoint generation during gameplay according to exemplary embodiments. Exemplary method 300 is provided by way of example, as there are a variety of ways to carry out the methods disclosed herein. The method 300 as shown in FIG. 3 may be executed or otherwise performed by one or a combination of various systems, such as a computer implemented system. The method 300 may occur during the method 200 such as following block 206 when the object is struck.

At block 302, a player may strike or otherwise interact with an object. This block is similar to that from the method 200 at block 206.

At block 304, the player's camera position and direction received by the server.

At block 306, points on the surface of the object are identified. This may be done by casting physic traces from the camera position towards the object that was struck. The position and direction of the player's camera may be used to ensure that the player will be able to see any weakpoint that might be created.

At block 308, the points are recorded. The points where the physics trace hits the object are recorded. Other data may be recorded. For example, the type of weapon/tool used to strike the object, the angle of the initial hit on the object, the location of the initial hit on the object, the number of hits (e.g., it may be possible for the player to strike the object multiple times before the method 300 is completed; such multiple strikes may impact the weakpoint determination).

At block 310, the recorded points are compared against each other. For example, the best point may be based on a distance from the center of the screen (e.g., farther away is better). In other embodiments, the distance from possible previous weakpoints may be used (e.g., farther away is better). In other embodiments, the best point may be determined by a direction of the normal of the surface struck by the physics trace (e.g., the more it points towards the player's screen, the better). In various embodiments, the best point may be based on a combination of the distances and the direction described above. In other embodiments, the best point may be compared to a predetermined location, threshold, and/or benchmark. For example, the player's level and/or skills may be used as a determining factor in determining the best point. A higher level/skilled player may have a harder to hit weakpoint generated than a lower lever/less skilled player.

In order to prevent weakpoints from being generated that are too easy to hit, a validation process may be used. When a player strikes an object, physics traces may be cast from the location of the player's camera towards the object that was struck. The location of traces that hit this object may be stored and filtered based on the criteria listed herein, for example. When the best location has been chosen, this location may be sent to the server. The server may perform a validation to see if the location sent from the client is within a reasonable range of expected locations. This may be used to prevent cheating. If the location passes the validation tests, a weakpoint is spawned at that location.

Various embodiments may include screen space distance filtering. When the player strikes an object, any relevant data needed to transform a three-dimensional (3D) point from the game universe to the screen is sent from the client to the server. Using any of the possible point calculation methods described above, a list of possible points is generated. This list of possible points is transformed from the game universe to the display, placing them all on the same 2D plane. From that list, the best point may be chosen using a set of criteria. For example, the criteria may include the point being inside of the player's screen or field of view, and/or the point being a certain minimum distance away from a possible previous weakpoint position (that would also be in 2D space), and/or the point being a certain minimum distance away from the center of the player's screen.

At block 312, based on the comparison, the best point is chosen.

At block 314, when the best point is chosen, a weakpoint is created at that point. The weakpoint may be created at the specific location or may be created within a distance of that specific location. The weakpoint may have a finite life such that it exists for a particular length of time. The life of the weakpoint may be determined by the server for each generated weakpoint based on an algorithm or the particular object or the player characteristics and/or profile (e.g., a higher level player may get shorter life weakpoints while a novice player may get longer life weakpoints). In various embodiments, the weakpoint's life may last until struck by the player. Other weakpoint factors may be determined including speed of weakpoint generation, interval between weakpoints, and varying sizes of weakpoints (e.g., larger or small based on player level/skill).

There may be various types of weakpoints. For example, some weakpoints may be able to be struck by the player with any weapon/tool/implement in the game. However, certain weakpoints may require specific types of weapons/tools/implements to receive the benefit of the weakpoint. Hitting a weakpoint with anything other than the required/specified weapon/tool/implement may count as a miss, and may include, in some embodiments, a negative effect. For example, if the player strikes a weakpoint with other than the required/specified weapon/tool/implement, the player may sustain damage or lose resources/points. Each different type of weakpoint may have different visual and audio attributes (e.g., size, color, shape, sound, etc.) that describe to the player what type of weapon/tool they need to use to hit the weakpoint or the next weakpoint (e.g., a sound when struck). For example, the type of weakpoints that show up on an object could change to create varying types of combinations. For example, the first weakpoint may be a melee weapon weakpoint, but the second and third weakpoints may require ranged weapons, etc. This may create patterns for the player to follow, and the player may be rewarded with applying greater damage to the object as well as greater rewards (e.g., higher resource value obtained).

At block 316, when a player strikes a weakpoint, the damage may be calculated as if the player struck the surface that the weakpoint is placed on, but with an additional multiplier applied to the base damage value. For example, the damage caused by striking the weakpoint may be 2× the base damage value. The multiplier may remain the same for each subsequent weakpoint. In some embodiments, the multiplier may decrease or increase for subsequent weakpoints. For example, the multiplier may be a fractional multiplier which decreases the damage caused by striking the spot or point. In some embodiments, these spots, could be referred to as strongpoints (rather than weakpoints), however the strongpoint may be implemented as described herein for the weakpoints. The weakpoint damage multiplier may vary based on the object type, the player, the player's level/skill, the weapon used, and/or the level of the game.

The method 300 may be applied again following the weakpoint being struck. This may be optional as certain objects may have a single weakpoint. Certain objects may have multiple weakpoints. In various embodiments, the number of weakpoints for an object may be predetermined in the game design; however, as described herein, the location of the weakpoints may be dynamically generated during gameplay in response to the player striking an object.

Various embodiments may include combining/chaining of weakpoints. For example, when a weakpoint is struck by a player, a second weakpoint would be spawned. In some embodiments, this second weakpoint may have a shorter lifetime than the first weakpoint, and striking it would cause additional damage. As players "chain" together weakpoint hits across multiple weakpoints, players may be given graduating visual and audio effects, communicating to the player that each new hit is causing more damage than previous hits. However, if a player does not hit a weakpoint before it expires, the combination/chain would reset.

Various embodiments may include a graphic or indicator that appears to direct the player to the next weakpoint in the combining/chaining. For example, an arrow or lightning bolt may appear indicating the direction of the next weakpoint.

Various embodiments may include object-to-object weakpoint jumping. After striking a weakpoint, and destroying the object, a weakpoint may appear on another object within the vicinity. This embodiment may be combined with the combining/chaining described above to allow for players to create larger destructive combinations as moving from one object to another object.

Various embodiments may include non-destructive weakpoints. In addition to destructive weakpoints, there may be weakpoints that have non-destructive effects. For example, weakpoints may appear on the newly created structures. These spots, when hit, might speed up construction time, and/or add hit points or repair points or additional buffs to the structure (e.g., repair or regenerate the structure), rather than causing damage to the structure. These spots may be referred to as repair points rather than weakpoints but may be implemented as described herein. These repair points and strong points (described above) may have different appearances from weakpoints to allow a player to distinguish the different kinds of points. In some embodiments, these points or spots may have the same appearance as a weakpoint. An object may have these different kinds of points present. In some embodiments, following the first strike of the object, a sequence of points may be generated and each may be different to cause the player to determine which they should strike, depending on the gameplay situation.

Various embodiments may include basing weakpoint type, location, number, chaining, etc. on the player characteristics and/or profile. For example, a player's level may be taken into account with respect to the weakpoint. A higher level player may receive less weakpoints than a lower level player. A lower level player may get weakpoints that offer less points/resources than a higher level player. Higher level players may have weakpoints generated at harder to hit locations. The player's profile may influence weakpoints. For example, a player that plays different types of games (such as a roleplaying or strategy), and is playing the game (such as a shooter type game) for the first time, may get additional weakpoints of higher value to encourage the player to play the game again. In other embodiments, a player who uses cheat codes may not receive weakpoints or may receive weakpoints which actually cause damage to the player character when struck.

Various embodiments may be implemented in a variety of manners. For example, an offline weakpoint calculation may be used. When an object is saved by a content creator during game development, one or more possible weakpoints may be calculated. The weakpoints may be calculated by casting several physics traces towards the object from random locations and orientations, and then saving the points where the physics traces collide with the object and analyzing the 3D model. The points may then be choosen on the surface of the 3D model.

From this list of possibilities, the points may be filtered such that some or all points fit certain criteria. For example, the criteria may include being within a specified minimum and maximum distance from other points, and/or being on what the player perceives as the surface of the 3D model (e.g., on the outside of a car, not inside the car's cabin), and/or having a physics trace collision normal that points away from the center of the model. After the list is filtered, this list of possible weakpoint locations may be saved with the object.

The game implementation may be performed in a variety of manners. For example, when a player strikes an object, the player's camera location and direction may be sent from the player's client to the game server. When the server receives the player's camera location and direction, the server may use this data, combined with the possible weakpoint positions that were calculated at save time during object creation (as described above), to pick an ideal weakpoint location. Criteria for this may include, for example, the point being visible from the player's camera, and/or the point being a specified distance from the center of the player's screen, and/or the point being a certain minimum distance from possible previous weakpoints, and/or the point or object having a surface normal that is pointing towards the player's camera. When a point is chosen, a weakpoint may be created at that location. From here, implementation would be similar to the object weakpoint system described in exemplary embodiments.

In various embodiments, the offline weakpoint calculation may be implemented in other manners. For example, when an object is created, both the client and server may cast identical or similar sets of physics traces at the object, storing which ones hit. The server may then choose a random seed, which may then be used to randomly remove points from the list of positive hits. This seed may be sent to the client, which then may perform the same or similar operation, ensuring that both client and server have the same or related list of points. When a player strikes an object, the player's camera location and direction may be sent from the player's client to the game server. When the server receives the player's camera location and direction, the server may use this data, combined with the possible weakpoint positions that were calculated at save time as described above, to pick an ideal weakpoint location. Criteria for this may include, for example, the point being visible from the player's camera, and/or the point being a specified distance from the center of the player's screen, and/or the point being a certain minimum distance from possible previous weakpoints, and/or the point or object having a surface normal that is pointing towards the player's camera. When a point is chosen, a weakpoint may be created at that location or an appropriate location. From here, implementation would be similar to the object weakpoint system described in exemplary embodiments.

Various embodiments may include a client-side weakpoint calculation instead of calculating the weakpoints on the server. This may allow each client to perform its own weakpoint calculations, shifting the load from the server. This embodiment may account for any delay between sending the player's camera information to the server and when the server determines the location of the weakpoint which could cause weakpoints to show up in locations not in the player's view if the player's camera is moving quickly or there is a high latency over the network connection between client and server. This embodiment may be available in the game and be implemented in situations where the network connection between the client and the server fails to meet a minimum speed and/or latency value. Upon the network reaching the minimum values, the server side calculation may be restored.

FIGS. 4 through 7 illustrate weakpoint generation during gameplay in accordance with exemplary embodiments. FIGS. 4 through 7 represent screen shots of gameplay in a computer game. It should be appreciated that these figures are meant to be exemplary and non-limiting, as the various embodiments described herein may be applied to a variety of different computer game types.

Figure 4:
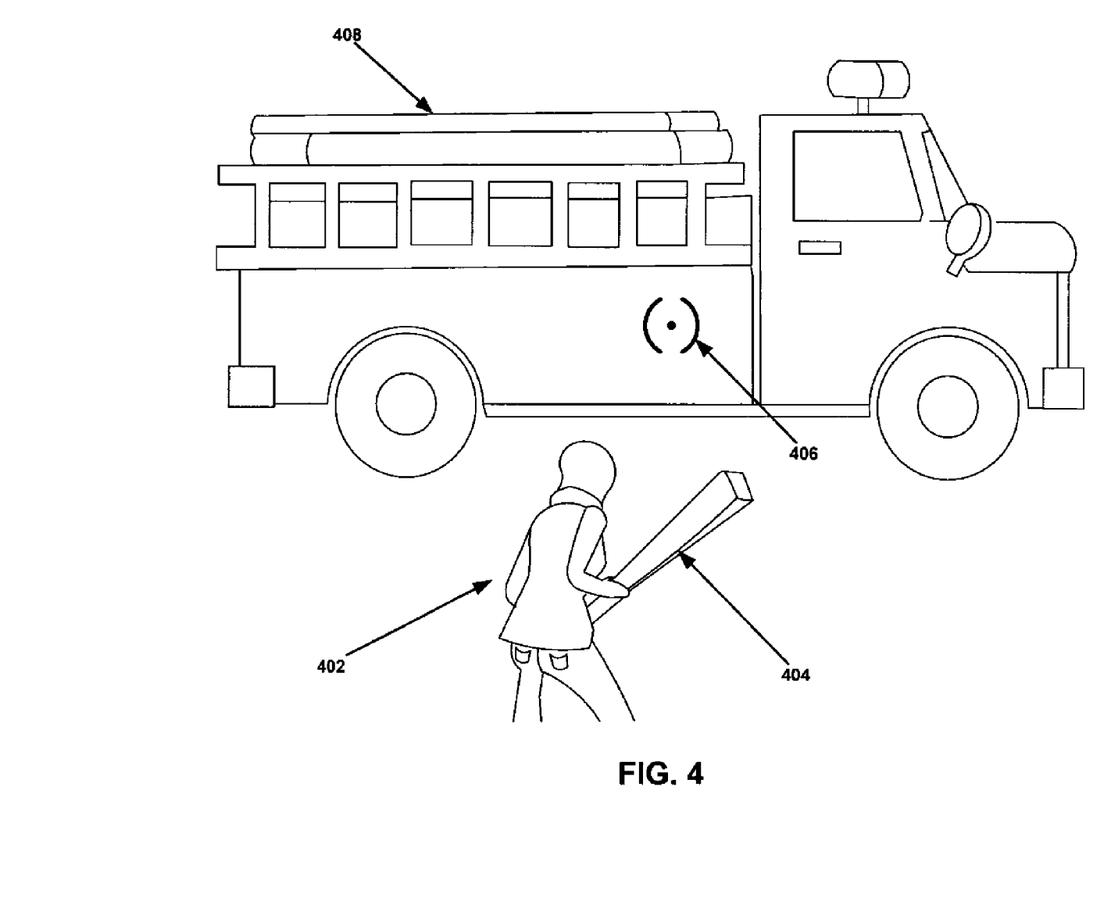
FIG. 4 is a depiction of weakpoint generation during gameplay in accordance with an exemplary embodiment.

As depicted in FIG. 4, a player character 402 has a weapon 404. For example, the player character is holding a board, which may serve as a melee weapon. It should be appreciated that a variety of other weapon styles and types are possible including edged and ranged weapons. There may be an onscreen aiming or targeting reticle 406. The player character 402 may be targeting a vehicle 408. For example, the vehicle may be a fire truck as depicted. It should be appreciated that this is merely exemplary and non-limiting. In some embodiments, the vehicle may be replaced by a humanoid, animal, or creature. In other embodiments, the vehicle may be replaced with another player character. In various embodiments, striking the vehicle 408 may yield resources to the player character 402 from damage inflicted upon this vehicle in this particular embodiment. It should be appreciated that in other embodiments, striking the vehicle may not yield resources but may cause damage to the vehicle.

Figure 5:
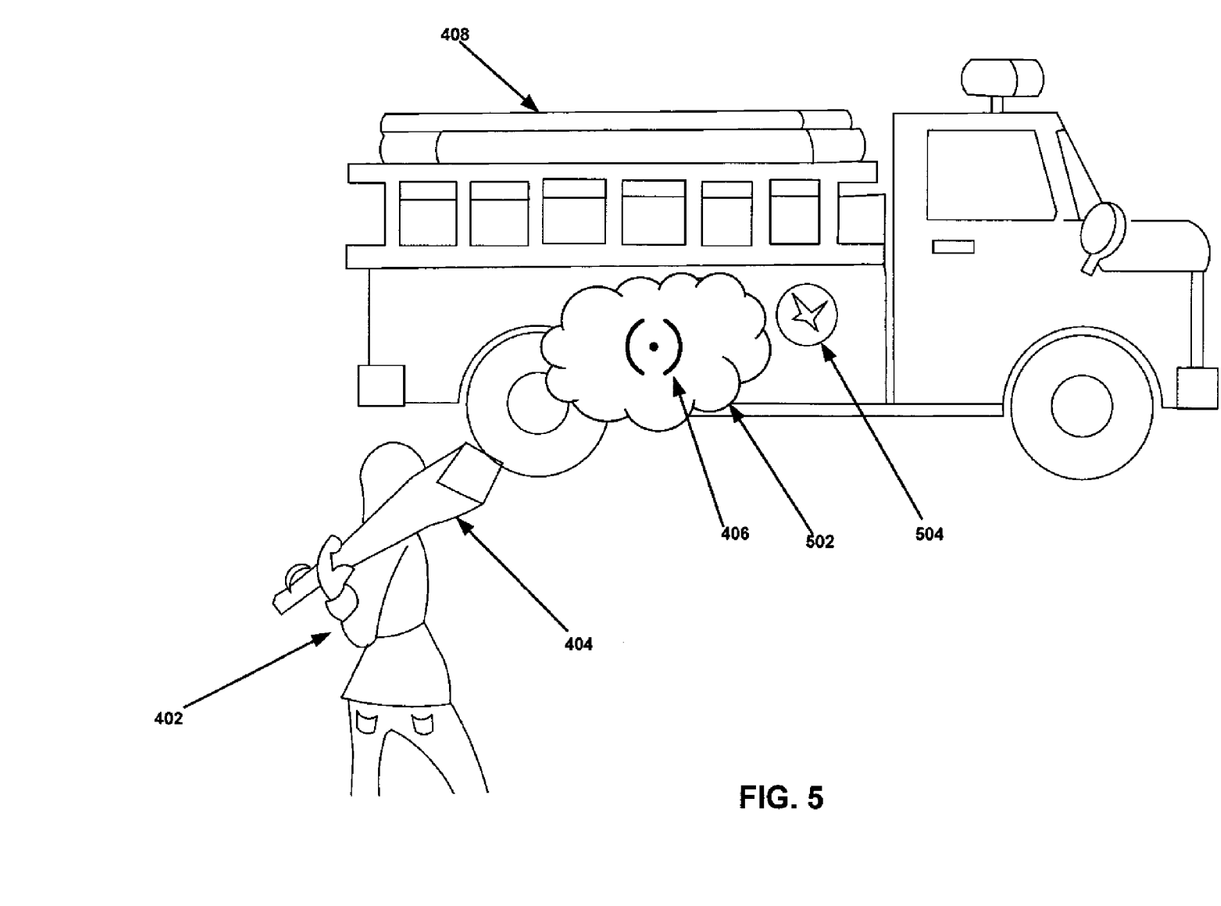
FIG. 5 is a depiction of weakpoint generation during gameplay in accordance with an exemplary embodiment.

In FIG. 5, the player character 402 is depicted following a strike 502 on the vehicle 408 from the weapon 404. The strike 502 can be seen to have occurred at the position of the aiming reticle 406. The strike 502 may generate damage to the vehicle 408. For example, a debris cloud may occur as depicted. The damage may be of a particular amount that is calculated by the game. According to exemplary embodiments, as a result of the strike, a weakpoint 504 may be generated as described above. The weakpoint 504 may be located at a position on the vehicle 408 that is displaced from the strike 502. The weakpoint 504 may have a particular shape, design, and/or color to enable the player controlling the player character 402 to notice the weakpoint 504. In various embodiments, the weakpoint 504 may be transitory and may only appear for a certain length of time. The length of time may be based certain factors. For example, the factors may include the player character 402 level or skill set, the player, the weapon 404, the vehicle 408, and/or a variety of other factors.

Figure 6:
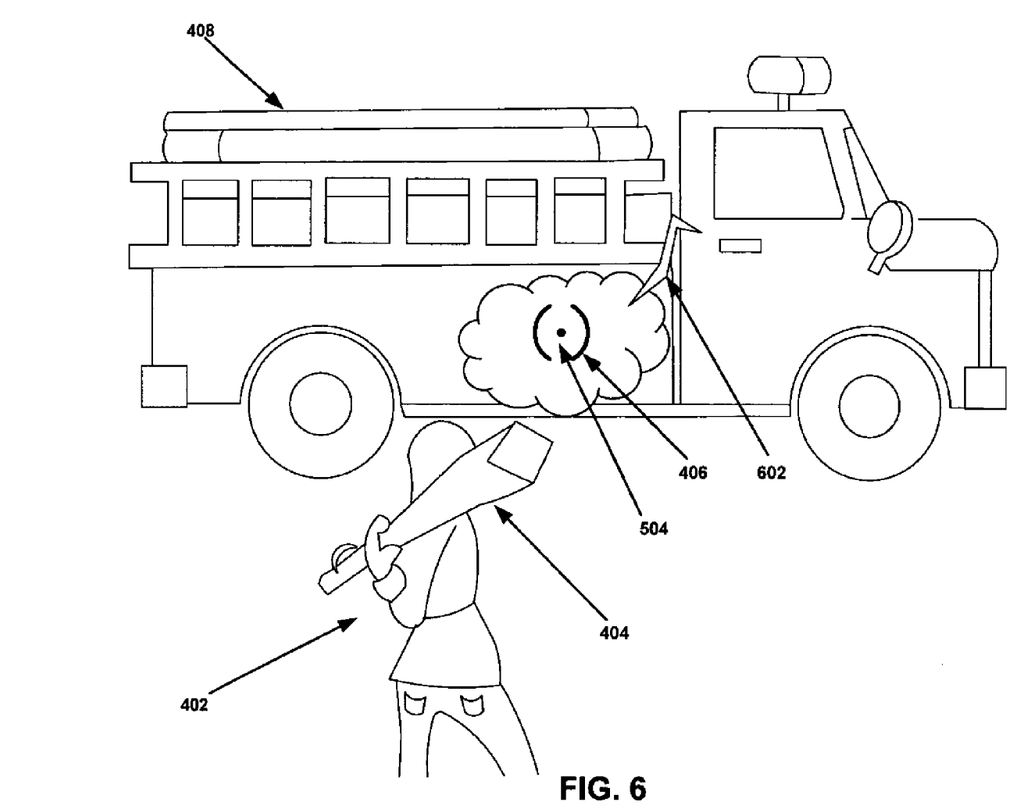
FIG. 6 is a depiction of weakpoint generation during gameplay in accordance with an exemplary embodiment.

In FIG. 6, the player character 402 has struck the weakpoint 504 (e.g., the player character has struck the weakpoint 504 using the weapon 404 and the aiming reticle 406 and the weakpoint 504 in FIG. 6 is depicted as having disappeared following the strike and a damage animation has occurred). The strike of the weakpoint 504 may generate damage to the vehicle 408 and/or resources for the player character 402. According to exemplary embodiments, striking the weakpoint 504 may generate more damage and/or resources than the strike 502. For example, the damage may be a multiple of the strike 502. In some embodiments, the weakpoint 504 may generate a different type of damage and/or resources from the strike 502.

In various embodiments, following the strike on the weakpoint 504 an animation 602 may be generated. The animation 602 may be a shape that serves as indicator to the position of the next weakpoint. For example, the animation 602 may be a lightning bolt. It should be appreciated that a variety of shapes could be used. The animation 602 may be transitory in nature and thus may only appear on the screen for a limited amount of time. For example, the animation 602 may disappear once the next weakpoint appears.

Figure 7:
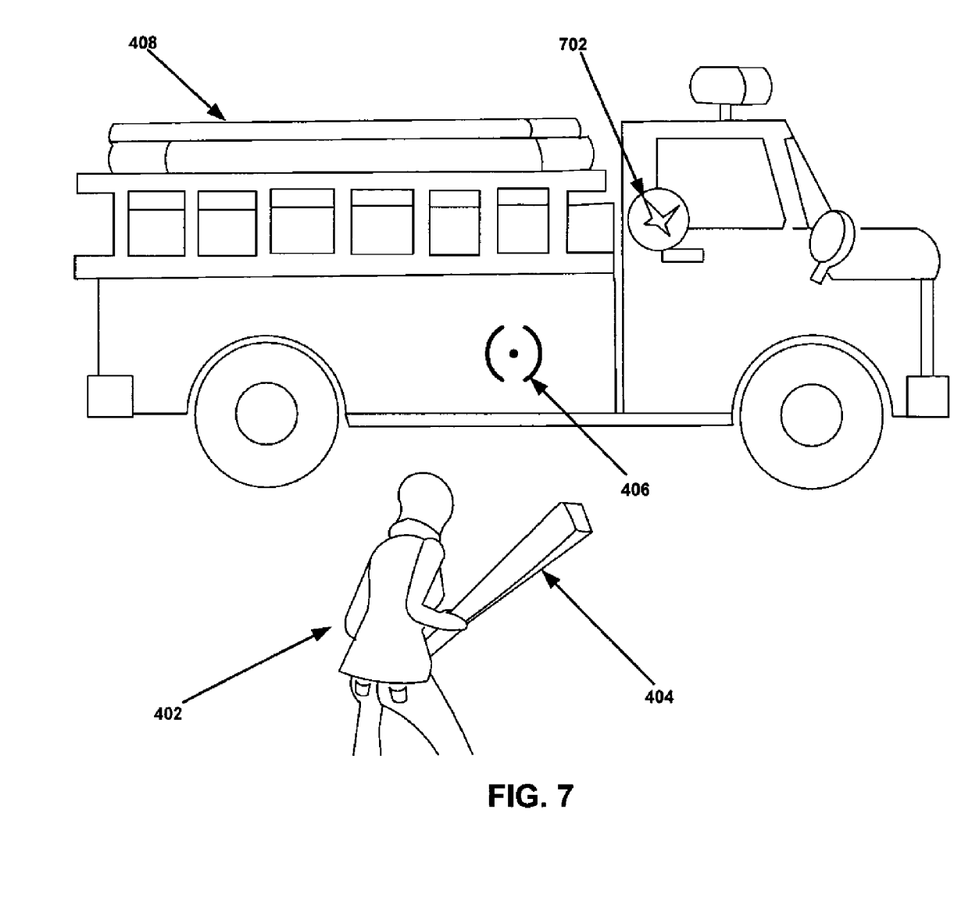
FIG. 7 is a depiction of weakpoint generation during gameplay in accordance with an exemplary embodiment.

In FIG. 7, a second weakpoint 702 is depicted on the vehicle 408. The second weakpoint may be located in the region to which the animation 602 indicated. The player character 402 may shift the aiming reticle 406 and strike the weakpoint 702 as described above with respect to the weakpoint 504. The second weakpoint 702 may generate additional damage and/or resources. The amount may be the same as, equal to, or less than the damage and/or resources from the weakpoint 504. In some embodiments, the weakpoint 702 may generate a different type of damage and/or resources from the strike 502 and/or the weakpoint 504.

In various embodiments, following a strike of the weakpoint 702, another animation may occur to indicate the direction of a subsequent weakpoint. Weakpoints may continue to be generated until the vehicle 408 is destroyed (e.g., it has taken a maximum amount of damage and/or has no more resources to provide). In some embodiments, the animation may indicate an end to the weakpoints.

While the embodiments have been particularly shown and described within the framework of computer games, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages of the present invention will be apparent to those skilled in the art from consideration of the specification and practice of the invention disclosed herein. The specification and examples should be considered exemplary.

What is claimed is:

1. A computer implemented method for dynamically generating a weakpoint on an object surface during computer gameplay, comprising:

receiving, by at least one computer processor, a camera position and a direction of a player in a computer game based on a player interaction with an object;

identifying, by the at least one computer processor, a plurality of points on a surface of the object based on information from the camera position towards the object;

comparing, by the at least one computer processor, each of the plurality of points against one another;

determining, by the at least one computer processor, a best point from the comparing, wherein the best point is chosen based on at least one of distance from a center of the player's screen, distance from any previous weakpoints, and direction of a normal of the surface struck by a physic trace; and generating, by the at least one computer processor, a weakpoint on the surface of the object based on the best point.

2. The method of claim 1, wherein the at least one computer processor is part of a server.

3. The method of claim 1, wherein the at least one computer processor is part of a client.

4. The method of claim 1, wherein the information from the camera position comprises the physic trace cast.

5. The method of claim 1, wherein the weakpoint, when struck by the player, results in increased damage to the object as compared to a strike on a non-weakpoint of the object.

6. The method of claim 1, further comprising:

receiving, by at least one computer processor, a second camera position and a second direction of the player based on the player interaction with the object;

identifying, by the at least one computer processor, a second plurality of points on the surface of the object based on information from the second camera position towards the object;

comparing, by the at least one computer processor, each of the second plurality of points against one another;

determining, by the at least one computer processor, a second best point from the comparing, wherein the second best point is chosen based on at least one of distance from the center of the player's screen, distance from any previous weakpoints, and direction of the normal of the surface struck by the physic trace; and generating, by the at least one computer processor, a second weakpoint on the surface of the object based on the second best point.

7. The method of claim 1, wherein the weakpoint can only be struck with a particular weapon or tool.

8. The method of claim 6, further comprising:

generating, by the at least one computer processor, a graphical indicator that is visible to the player and defines a direction of the second weakpoint with respect to the weakpoint.

9. The method of claim 1, further comprising:

performing, by the at least one computer processor, a validation of the best point prior to generating the weakpoint.

10. A system, comprising:
a processor; and a memory comprising computer-readable instructions which when executed by the processor cause the processor to perform the steps for dynamically generating a weakpoint on an object surface during computer gameplay, comprising:

receiving a camera position and a direction of a player in a computer game based on a player interaction with an object;

identifying a plurality of points on a surface of the object based on information from the camera position towards the object;

comparing each of the plurality of points against one another;

determining a best point from the comparing, wherein the best point is chosen based on at least one of distance from a center of the player's screen, distance from any previous weakpoints, and direction of a normal of the surface struck by a physic trace; and generating a weakpoint on the surface of the object based on the best point.

11. The system of claim 10, wherein the processor is part of a server.

12. The system of claim 10, wherein the processor is part of a client.

13. The system of claim 10, wherein the information from the camera position comprises the physic trace cast.

14. The system of claim 10, wherein the weakpoint, when struck by the player, results in increased damage to the object as compared to a strike on a non-weakpoint of the object.

15. The system of claim 10, further comprising:

receiving a second camera position and a second direction of the player based on the player interaction with the object;

identifying a second plurality of points on the surface of the object based on information from the second camera position towards the object;

comparing each of the second plurality of points against one another;

determining a second best point from the comparing, wherein the second best point is chosen based on at least one of distance from the center of the player's screen, distance from any previous weakpoints, and direction of the normal of the surface struck by the physic trace; and generating a second weakpoint on the surface of the object based on the second best point.

16. The system of claim 10, wherein the weakpoint can only be struck with a particular weapon or tool.

17. The system of claim 15, further comprising:

generating, by the at least one computer processor, a graphical indicator that is visible to the player and defines a direction of the second weakpoint with respect to the weakpoint.

18. The system of claim 10, further comprising:

performing, by the at least one computer processor, a validation of the best point prior to generating the weakpoint.

* * * * *